United States Patent Office.

EDWIN L. BRADY, OF NEW ORLEANS, LOUISIANA.

Letters Patent No. 68,942, dated September 17, 1867.

IMPROVED LUBRICATING OIL.

*The Schedule referred to in these Letters Patent and making part of the same.*

TO ALL WHOM IT MAY CONCERN:

Be it known that I, EDWIN L. BRADY, of New Orleans, in the parish of Orleans, and State of Louisiana, have invented a new and improved Clarified and Saponified Lubricating Compound Oil; and I do hereby declare that the following is a full and clear description thereof, and of the mode of preparing and mixing the same.

This lubricating oil is made mainly of animal or fish oil, mixed with quite fifty per cent. of water, said water being first prepared and clarified by being placed in a barrel, tank, or vessel, in which is first placed a layer of sulphur and an overlaying layer of quicklime, with a small amount of borax and a large proportion of carbonate of soda. The water remains with the chemicals in contact in the tank for ten to twenty hours. The lime, sulphur, borax, and carbonate of soda in this time are throwing off a species of gas which is rapidly absorbed by the water, and the water being clarified by the said action of the said gas; beside, the water absorbs a portion of the strength and nature of all the chemicals contained in the tank. The water is now ready to be drawn from the tank, and the cock or faucet used to draw the water from the tank should be placed at a point on the tank at least one foot above the solid matter or chemicals contained in the tank, to the end that none of the solid substance of the remainder of the chemicals may be drawn off with the water. The water now drawn off, it is ready, by the addition of a small amount of spirits of ammonia (hartshorn,) to be mixed with the oil. This is done by pouring equal parts of the oil (animal or fish oil) with equal parts of this prepared water, when the mixture immediately unites as one mass of oil, and is ready, with the addition of the hartshorn, for immediate use.

The proportions of ingredients for mixing Brady's clarified and saponified oil are as follows: To prepare the water, (one gallon,) one-half pound lime, one-fourth of a pound sulphur, one-eighth of a pound carbonate of soda, one-sixteenth of a pound borax, one-half ounce spirits of ammonia, one gallon distilled water. To one gallon of water thus prepared add one gallon lard, whale oil, or fish oil. This mixture makes two gallons of Brady's clarified and saponified lubricating oil.

What I claim as my invention, and desire to secure by Letters Patent, is—

A combination of the various substances, to wit, oil, water, spirits of ammonia, carbonate of soda, quicklime, and sulphur, used to make the compound clarified and saponified lubricating oil, known as Brady's oil.

EDWIN L. BRADY.

Witnesses:
　J. A. WALKER,
　ROBERT I. KER.